United States Patent
Chan

(10) Patent No.: US 10,562,583 B1
(45) Date of Patent: Feb. 18, 2020

(54) FOLDING ELECTRICALLY POWERED VEHICLE

(71) Applicant: PUC Perfect Union Co., Ltd., New Taipei (TW)

(72) Inventor: Ching Chan, New Taipei (TW)

(73) Assignee: PUC PERFECT UNION CO., LTD., New Taipei (TW)

( * ) Notice: Subject to any disclaimer, the term of this patent is extended or adjusted under 35 U.S.C. 154(b) by 0 days.

(21) Appl. No.: 16/127,406

(22) Filed: Sep. 11, 2018

(51) Int. Cl.
| | |
|---|---|
| *B62K 15/00* | (2006.01) |
| *B62K 5/025* | (2013.01) |
| *B62K 5/06* | (2006.01) |
| *B62K 5/00* | (2013.01) |
| *A61G 5/08* | (2006.01) |
| *B62D 61/08* | (2006.01) |
| *B62K 5/02* | (2013.01) |

(52) U.S. Cl.
CPC ............ *B62K 15/006* (2013.01); *B62K 5/025* (2013.01); *B62K 5/06* (2013.01); *A61G 5/08* (2013.01); *B62D 61/08* (2013.01); *B62K 5/00* (2013.01); *B62K 5/02* (2013.01); *B62K 2005/001* (2013.01); *B62K 2202/00* (2013.01)

(58) Field of Classification Search
CPC .... B62K 15/006; B62K 5/06; B62K 2202/00; B62K 5/02; B62K 5/025; B62K 5/00; B62K 2005/001; A61G 5/08; B62D 61/08
USPC .................................................. 180/208, 213
See application file for complete search history.

(56) References Cited

U.S. PATENT DOCUMENTS

| | | | |
|---|---|---|---|
| 3,388,761 A | 6/1968 | Arpin | |
| 6,050,593 A | 4/2000 | McConnell | |
| 6,176,337 B1 | 1/2001 | McConnell | |
| 7,703,567 B2 | 4/2010 | Wang | |
| 7,926,606 B2 | 4/2011 | Wang | |
| 8,413,753 B2 | 4/2013 | Wu | |
| 8,684,396 B1 | 4/2014 | Hanson | |
| 8,776,932 B1 * | 7/2014 | Bussinger | B62K 15/006 180/208 |
| 9,016,702 B2 * | 4/2015 | Huang | B62J 1/08 280/87.041 |
| 9,060,909 B1 | 6/2015 | Gao | |
| 9,301,893 B1 * | 4/2016 | Wu | A61G 5/08 |
| D765,559 S * | 9/2016 | Chan | D12/131 |
| 9,553,729 B2 | 1/2017 | Chan | |
| 10,150,528 B2 * | 12/2018 | Kano | B62K 5/06 |

(Continued)

*Primary Examiner* — Muhammad Ijaz
*Assistant Examiner* — Kurtis Nielson
(74) *Attorney, Agent, or Firm* — Jackson IPG PLLC; Demian K. Jackson

(57) ABSTRACT

A folding electrically powered vehicle includes a handlebar unit mounted at an upper end of a stem; a front wheel; an inverted U-shaped front suspension assembly including an intermediate joint pivotably mounted on a lower portion of the stem, a rearward curved frame member, and two foot rests; a front frame having two ends of a front portion pivotably secured to the two ends of the suspension assembly, the front frame including two rearward extending bars; a rear frame including two side bars pivotably secured to the rearward extending bars, two rear wheels, and a stop tube across front portions of the side bars; a seat assembly including two bottom tubes pivotably secured to two ends of the rearward extending bars respectively, and a pivotal seat back; and two shock absorbers each pivotably secured to the seat assembly and the rear frame.

3 Claims, 6 Drawing Sheets

(56) References Cited

U.S. PATENT DOCUMENTS

| | | | |
|---|---|---|---|
| 2003/0141121 A1* | 7/2003 | Flowers | A61G 5/045 180/65.1 |
| 2007/0051548 A1* | 3/2007 | Kosco | B62K 5/025 180/208 |
| 2009/0308676 A1* | 12/2009 | Wang | B62K 5/007 180/208 |
| 2010/0084831 A1 | 4/2010 | Wang | |
| 2013/0062846 A1* | 3/2013 | Hsiao | B62K 5/00 280/87.05 |
| 2015/0137481 A1 | 5/2015 | Manternach | |
| 2015/0209205 A1* | 7/2015 | Ransenberg | B62K 15/008 280/641 |
| 2016/0016629 A1* | 1/2016 | Wang | B62K 15/00 180/208 |
| 2018/0162479 A1* | 6/2018 | Mazar | B62K 9/02 |
| 2019/0023347 A1* | 1/2019 | Block | B62K 5/025 |
| 2019/0225294 A1* | 7/2019 | Schneider | B60L 53/80 |
| 2019/0283831 A1* | 9/2019 | Zhang | B62K 21/125 |

* cited by examiner

FOLDING ELECTRICALLY POWERED VEHICLE

BACKGROUND OF THE INVENTION

1. Field of the Invention

The invention relates to electric vehicles and more particularly to a folding electrically powered vehicle such as personal mobility vehicle (PMV) which can be carried by a small car after being folded.

2. Description of Related Art

The popularity of personal mobility vehicles (PMVs) has dramatically increased over the last several decades. Although conventional PMVs provide the desired mobility to an operator, they suffered from several disadvantages. Firstly, they were difficult to store during nonuse. In short, they are bulky to be stored in a small room. Secondly, they were difficult to transport in a car also due to bulkiness.

Prior art has attempted to solve the problems of the transportation and storage of a PMV by collapsing or folding same. For example, U.S. Pat. No. 5,697,465 to Kruse discloses a personal mobility vehicle comprising a frame supported above the ground by two closely spaced side-by-side rear wheels adapted to steer about a generally upright steering axis and two spaced front wheels; the steering axis positioned along a central longitudinal axis of, and rearward of the frame; first drive means connected between the front wheels for propelling the vehicle; second drive means connected between the frame and the rear wheels for rotationally positioning the rear wheels about the steering axis through an angle of up to about 90.degree. in either direction from the longitudinal axis; a seat connected to and upwardly extending from the frame; control means including a hand-actuated lever supported on the seat for selectively controlling the rotational speed of the first drive means and the rotational steering positioning of the rear wheels by selective activation of the second drive means; a stored source of electric power mounted on the frame and connected between the control means and the first and second drive means; the front wheels being spaced apart along a common transverse axis and positioned in close proximity to the perimeter of the frame; an anti-tip wheel connected on each side of the frame between each the front wheel and the rear wheels and extending outwardly from the perimeter of the frame; each of the anti-tip wheel positioned vertically just above a support surface of the vehicle whereby one the anti-tip wheel will contact the support surface when the frame is tilted laterally from an at-rest generally horizontal position above the support surface; the first drive means is a transaxle assembly.

U.S. Pat. No. 8,720,995 B2 to Wu et al. discloses a foldable seat rack mountable between a body rack and a seat of a foldable motorized vehicle. It includes main supporting rods, upper rods, lower rods, a seat base, hooks, and an elastic element. Main supporting rods are fixed on two sides of the body rack respectively. Upper rods are pivoted on upper ends of the main supporting rods respectively. Lower rods are pivoted on middle portions of main supporting rods and a rear end of seat base respectively. Hooks are fixed on the upper ends of the main supporting rods respectively. The foldable seat base has a middle shaft. Middle portions on two sides of the seat base are opened with slide slots. Two ends of the middle shaft pass through the slide slots freely and are hooked by hooks. An elastic element is placed between the front end of the seat base, and the middle shaft.

However, the '995 patent has disadvantages including the seat rack being not structurally strong, no connection between the chassis plates and the upper rods (or the lower rods), and the folding process being difficult.

U.S. Pat. No. 9,533,729 B1 to Chang discloses a foldable electrically powered vehicle. While the device enjoys its success in the market, continuing improvements in the exploitation of folding electrically powered vehicle of this type are constantly being sought.

SUMMARY OF THE INVENTION

It is therefore one object of the invention to provide a folding electrically powered vehicle, comprising a stem; a fork mounted at a lower end of the stem; a handlebar unit mounted at an upper end of the stem; a front wheel rotatably mounted on two ends of the fork; an inverted U-shaped front suspension assembly including an intermediate joint pivotably mounted on a lower portion of the stem proximate the fork, a rearward curved frame member having two ends secured to two ends of the suspension assembly respectively, and two foot rests secured to the two ends of the suspension assembly respectively; a front frame having two ends of a front portion pivotably secured to the two ends of the suspension assembly by means of two first pivots respectively, the front frame including two rearward extending bars; a rear frame including two side bars pivotably secured to the rearward extending bars by means of two second pivots respectively, two rear wheels rotatably mounted on two rear ends of the side bars respectively, and a stop tube disposed across front portions of the side bars; a seat assembly including two bottom tubes pivotably secured to two ends of the rearward extending bars by means of two third pivots respectively, and a seat back pivotably secured to a rear end by means of two fourth pivots respectively; and two shock absorbers each having an upper end pivotably secured to a bottom of the seat assembly by means of a fifth pivot, and a lower end pivotably secured to the rear frame by means of a sixth pivot; wherein in an unfolded position, rear portions of the rearward extending bars are rested upon the stop tube; and wherein in response to pivoting the seat back toward a seat portion of the seat assembly, and pivoting the rear frame toward the front frame with all components connected to the first, second, third, fourth, fifth and sixth pivots (8) being pivoted to predetermined angles respectively, the folding electrically powered vehicle is folded.

The above and other objects, features and advantages of the invention will become apparent from the following detailed description taken with the accompanying drawings.

DETAILED DESCRIPTION OF THE INVENTION

Figure 1:
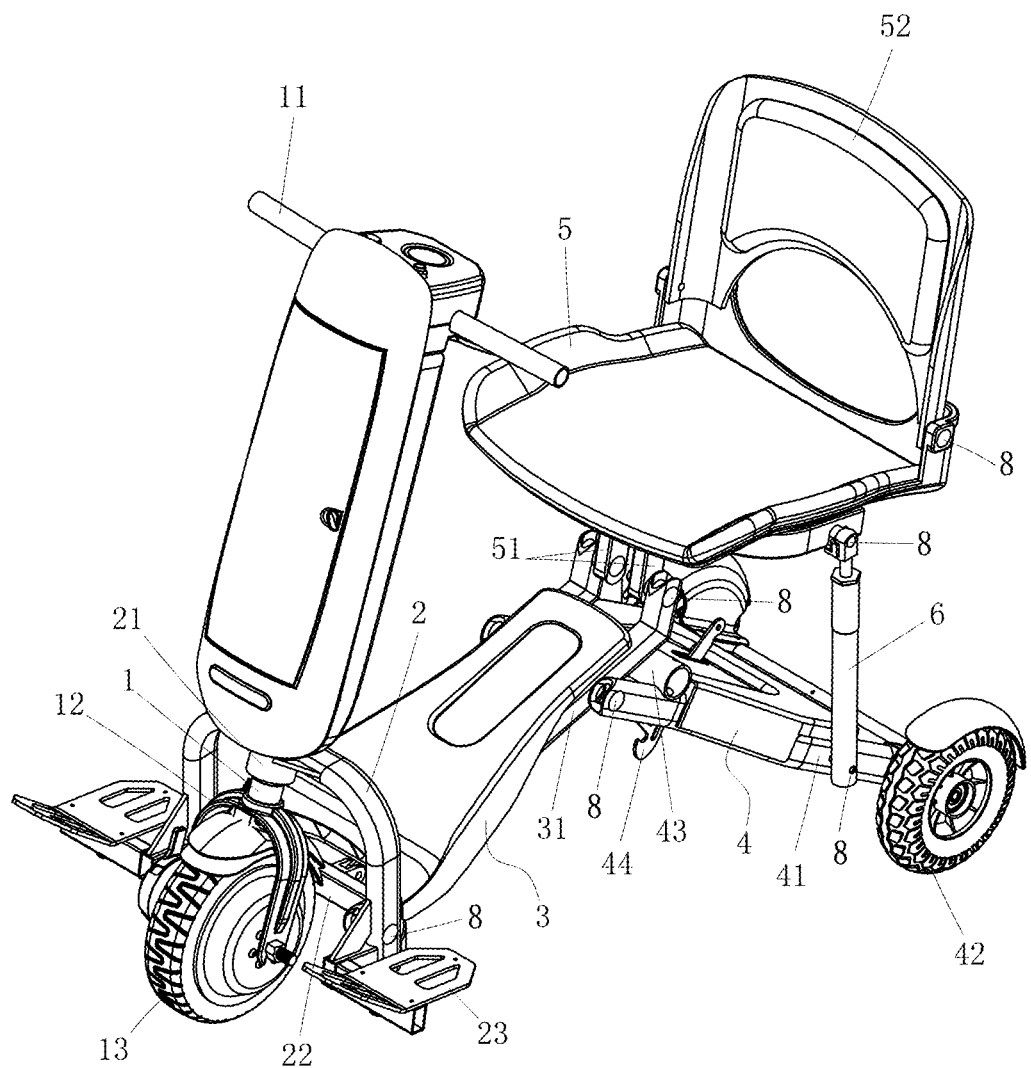
FIG. 1 is a perspective view of a folding personal mobility vehicle according to the invention.
Figure 2:
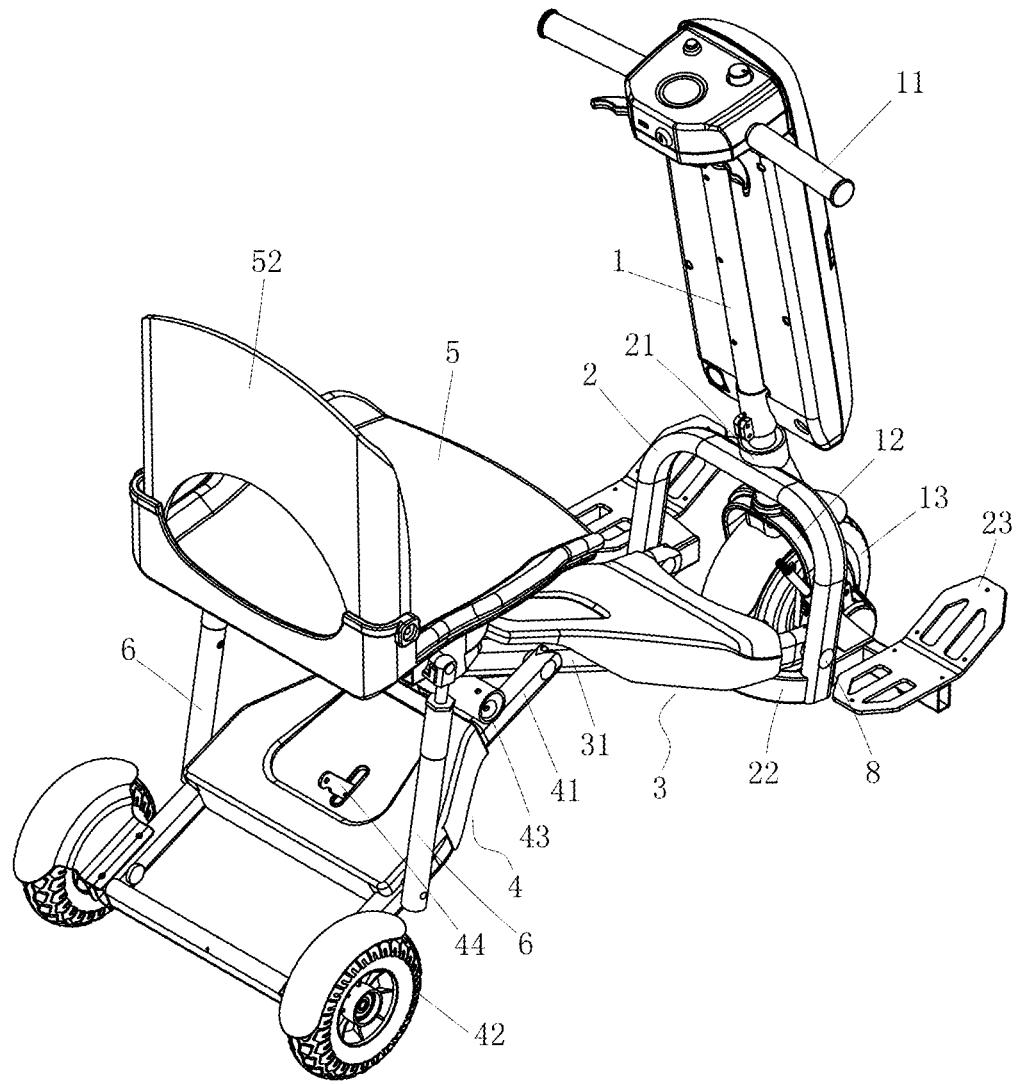
FIG. 2 is another perspective view of the folding personal mobility vehicle.
Figure 3:
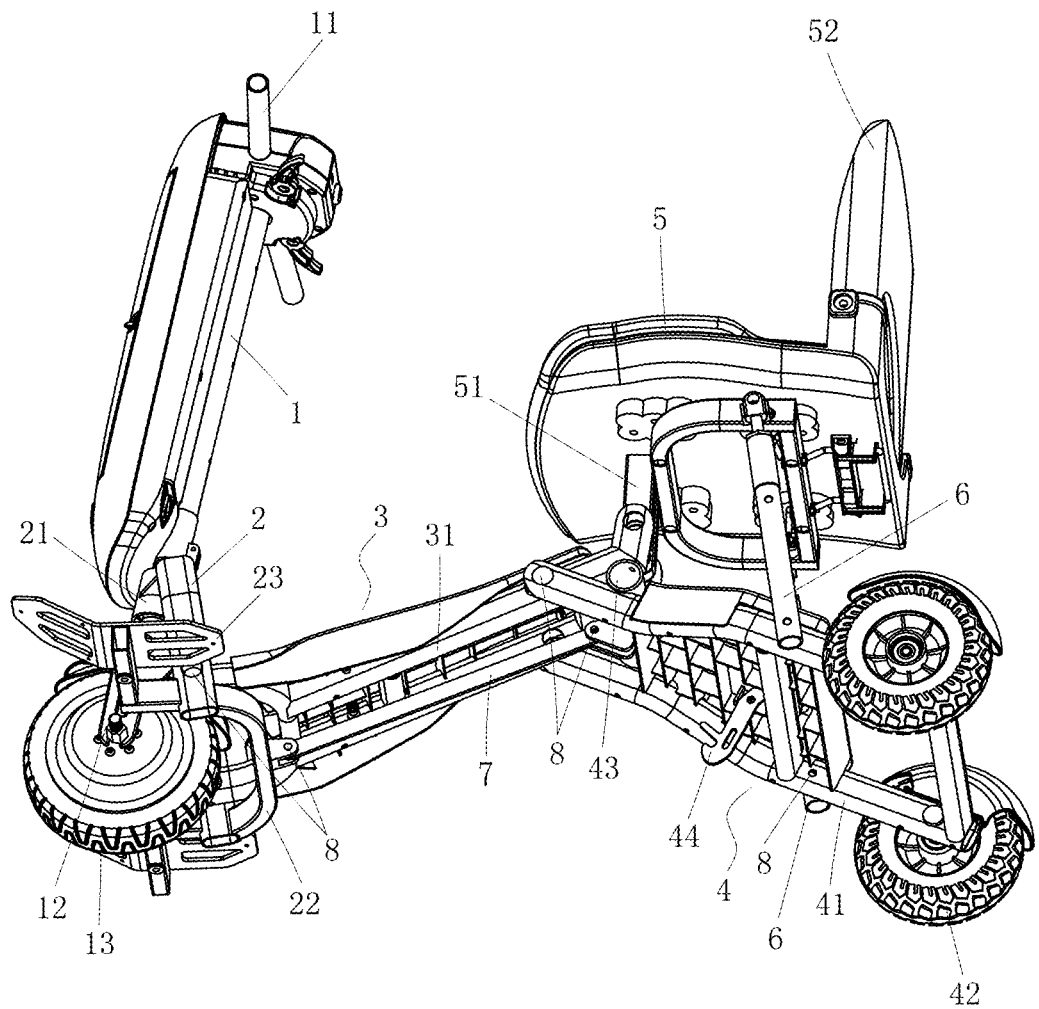
FIG. 3 is yet another perspective view of the folding personal mobility vehicle.

Referring to FIGS. 1 to 6, a folding personal mobility vehicle (PMV) in accordance with the invention comprises the following components as discussed in detail below.

A stem 1, a fork 12 mounted at a lower end of the stem 1, a handlebar unit 11 mounted at an upper end of the stem 1, and a front wheel 13 rotatably mounted on two ends of the fork 12 are provided.

An inverted U-shaped front suspension assembly 2 includes an intermediate joint 21 pivotably mounted on a lower portion of the stem 1 proximate the fork 12, a rearward curved frame member 22 having two ends secured to two ends of the suspension assembly 2 respectively, and two foot rests 23 secured to two ends of the suspension assembly 2 respectively.

A front frame 3 has two ends of a front portion pivotably secured to two ends of the suspension assembly 2 by means of two pivots 8 respectively and includes two rearward extending bars 31. A rear frame 4 includes two side bars 41 pivotably secured to the rearward extending bars 31 by means of another two pivots 8 respectively, two rear wheels 42 rotatably mounted on two rear ends of the side bars 41 respectively, a stop tube 43 provided across front portions of the side bars 41, and an intermediate hook 44.

A seat assembly 5 includes two bottom tubes 51 pivotably secured to two ends of the rearward extending bars 31 by means of another two pivots 8 respectively, and a seat back 52 pivotably secured to a rear end by means of another two pivots 8 respectively. Two shock absorbers 6 each have an upper end pivotably secured to a bottom of the seat assembly 5 by means of another pivot 8, and a lower end pivotably secured to the rear frame 4 by means of another pivot 8.

In a use position, rear portions of the rearward extending bars 31 are rested upon the stop tube 43.

Figure 4:
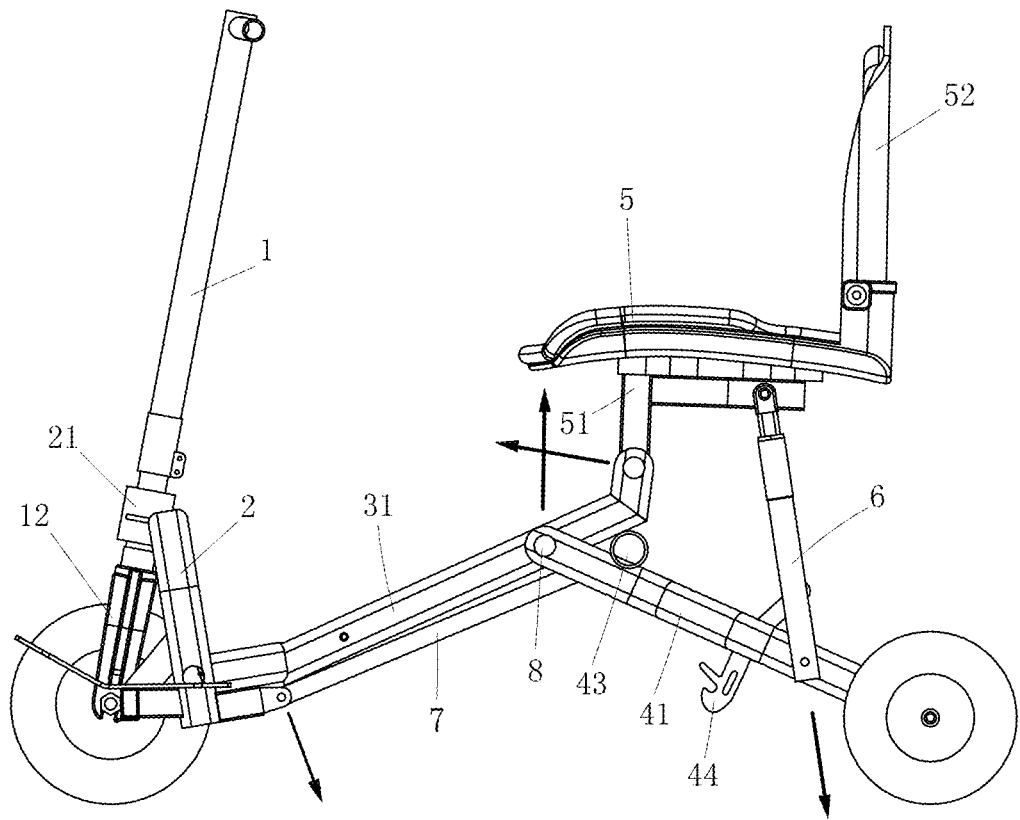
FIG. 4 is a side elevation of the folding personal mobility vehicle.
Figure 5:
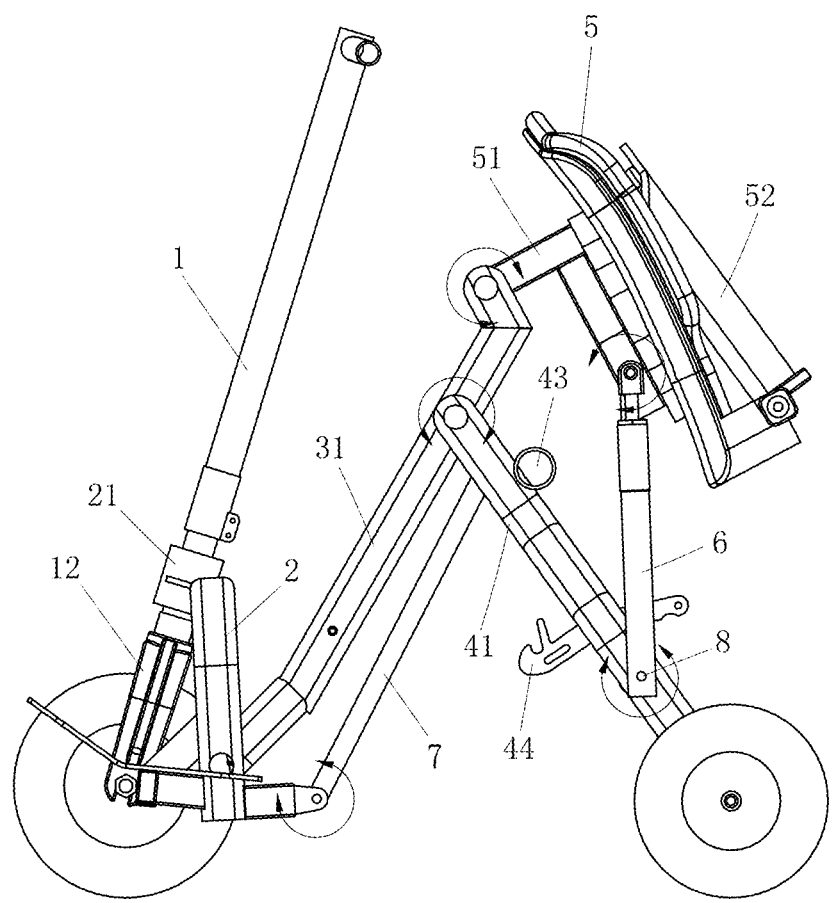
FIG. 5 is a view similar to FIG. 4 showing the personal mobility vehicle being folded.
Figure 6:
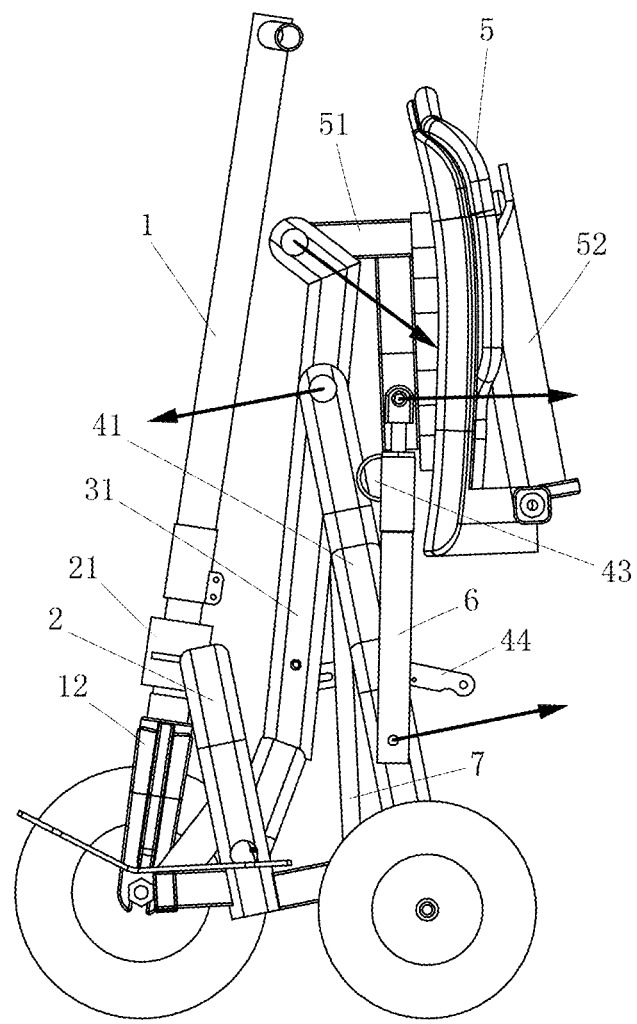
FIG. 6 is a view similar to FIG. 4 showing the personal mobility vehicle being fully folded.

Folding operation of the invention is discussed in detail below by referring to FIGS. 4 to 6 specifically. An individual may pivotably push the seat back 52 toward a seat portion of the seat assembly 5 until being stopped, counterclockwise pivot the rear frame 4 toward the front frame 3 with all components connected to the pivots 8 being pivoted in directions indicated by arrows. Finally, the individual may attach the hook 44 to the front frame 3 to fasten the fully folded PMV.

It is envisaged by the invention that the folded PMV can be carried by a small car.

While the invention has been described in terms of preferred embodiments, those skilled in the art will recognize that the invention can be practiced with modifications within the spirit and scope of the appended claims.

What is claimed is:

1. A folding electrically powered vehicle, comprising:
a stem (1);
a fork (12) mounted at a lower end of the stem (1);
a handlebar unit (11) mounted at an upper end of the stem (1);
a front wheel (13) rotatably mounted on two ends of the fork (12);
an inverted U-shaped front suspension assembly (2) including an intermediate joint (21) pivotably mounted on a lower portion of the stem (1) proximate the fork (12), a rearward curved frame member (22) having two ends secured to two ends of the suspension assembly (2) respectively, and two foot rests (23) secured to the two ends of the suspension assembly (2) respectively;
a front frame (3) having two ends of a front portion pivotably secured to the two ends of the suspension assembly (2) by means of two first pivots (8) respectively, the front frame (3) including two rearward extending bars (31);
a rear frame (4) including two side bars (41) pivotably secured to the rearward extending bars (31) by means of two second pivots (8) respectively, two rear wheels (42) rotatably mounted on two rear ends of the side bars (41) respectively, and a stop tube (43) disposed across front portions of the side bars (41);
a seat assembly (5) including two bottom tubes (51) pivotably secured to two ends of the rearward extending bars (31) by means of two third pivots (8) respectively, and a seat back (52) pivotably secured to a rear end by means of two fourth pivots (8); and
two shock absorbers (6) each having an upper end pivotably secured to a bottom of the seat assembly (5) by means of a fifth pivot (8), and a lower end pivotably secured to the rear frame (4) by means of a sixth pivot (8);
wherein in an unfolded position, rear portions of the rearward extending bars (31) are rested upon the stop tube (43); and
wherein in response to pivoting the seat back (52) toward a seat portion of the seat assembly (5), and pivoting the rear frame (4) toward the front frame (3) with all components connected to the first, second, third, fourth, fifth and sixth pivots (8) being pivoted to predetermined angles respectively, the folding electrically powered vehicle is folded.

2. The folding electrically powered vehicle of claim 1, further comprising a link (7) disposed under the front frame (3), the link (7) having a front end pivotably secured to the frame member (22) by means of a seventh pivot (8) and a rear end pivotably secured to the rear frame (4) by means of an eighth pivot (8).

3. The folding electrically powered vehicle of claim 1, further comprising a hook (44) disposed through the front frame (3), the hook (44) being configured to attach to and lock the front frame (3).

* * * * *